United States Patent [19]

Olshansky et al.

[11] Patent Number: 4,520,704

[45] Date of Patent: Jun. 4, 1985

[54] MOTOR DRIVEN SLITTER OF NARROW CONFIGURATION

[75] Inventors: Alexis Olshansky, Becket; Gerald A. Guild, Dalton, both of Mass.

[73] Assignee: Beloit Corporation, Beloit, Wis.

[21] Appl. No.: 520,847

[22] Filed: Aug. 5, 1983

[51] Int. Cl.[3] .......................... B23D 19/04; B26D 1/24

[52] U.S. Cl. .......................................... 83/499; 83/500; 83/425.2; 83/407

[58] Field of Search ................. 83/499, 498, 497, 500, 83/501, 502, 503, 425.2, 425.3, 425.4, 407

[56] References Cited

U.S. PATENT DOCUMENTS 2,132,713 10/1938 Winkler ............................ 83/407 X 3,176,566 4/1965 Patterson, Jr. ......................... 83/348

3,608,412 9/1971 Braden et al. ................. 83/425.2 X 4,024,784 5/1977 Mueller ............................. 83/500 X 4,381,605 5/1983 Holm ................................ 83/500 X

*Primary Examiner*—Donald R. Schran

*Attorney, Agent, or Firm*—Hill, Van Santen, Steadman & Simpson

[57] ABSTRACT

A paper web slitter having upper and lower slitter heads supporting cooperating rotary slitter blades, and wherein the lower slitter heads and blades together with appurtenances are of such narrow profile that the paper web is adapted to be separated into unusually narrow strips. In particular, the lower slitter heads carry motors which have driving connection on driving axes normal to lower slitter blade spindles supported in stable bearings in journal boxes on the generally triangular narrow profile standards on the lower slitter heads.

17 Claims, 6 Drawing Figures

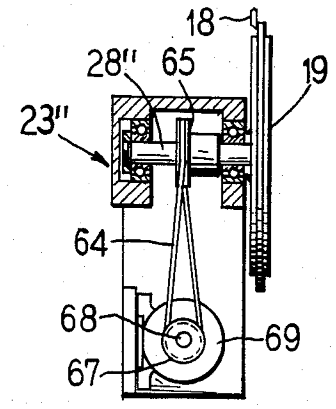
FIG. 6
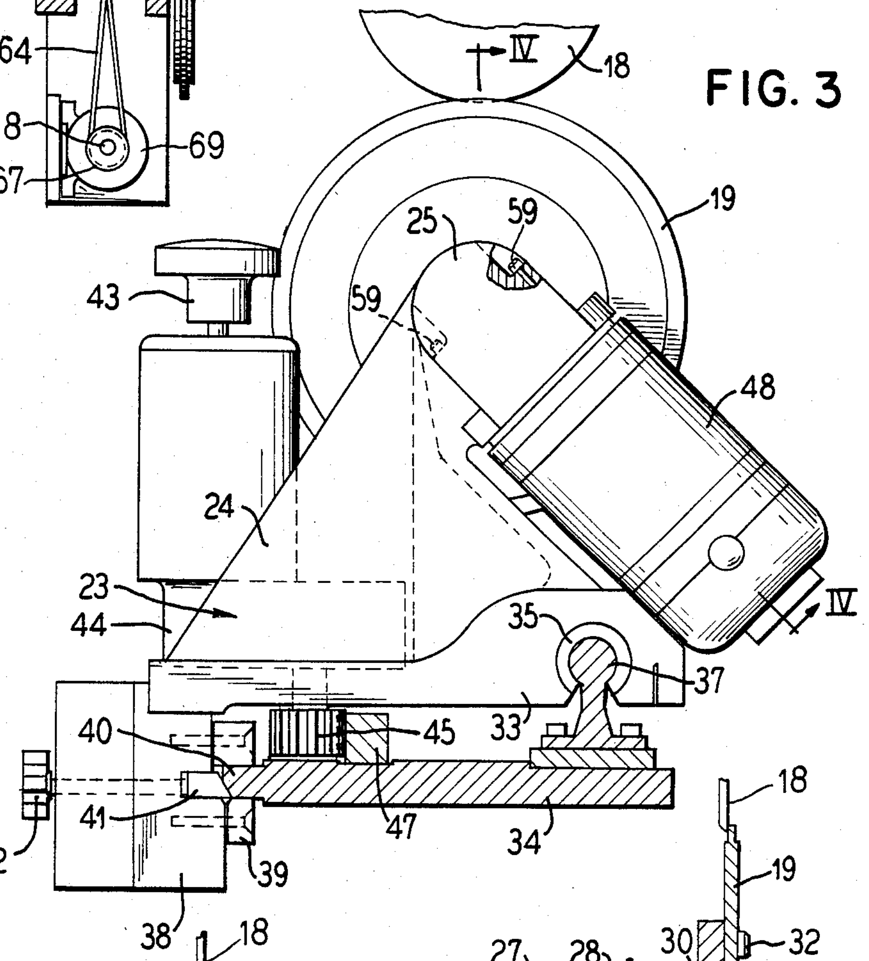
FIG. 3
FIG.5
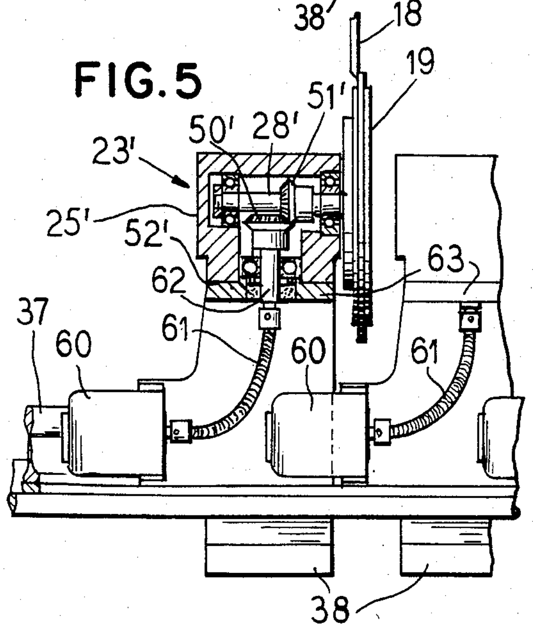
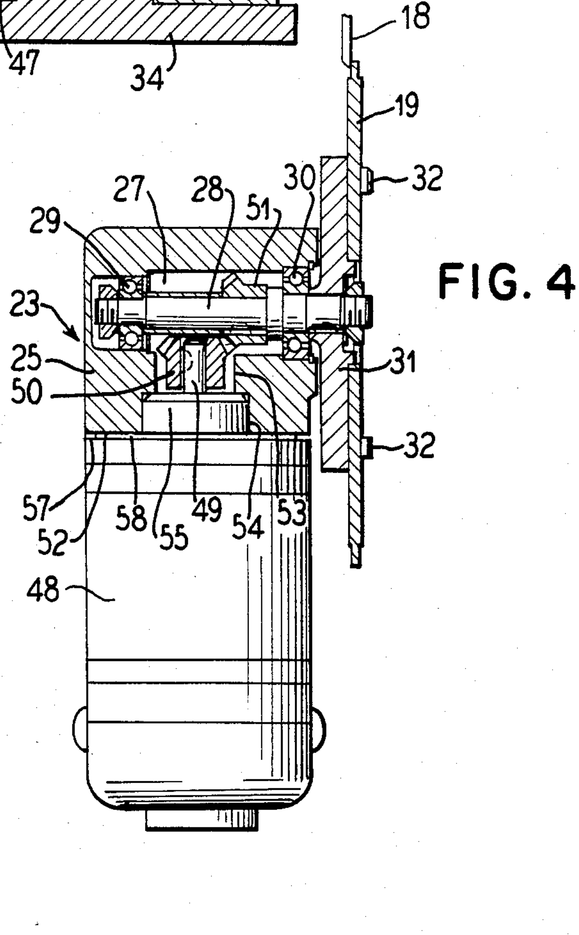
FIG. 4

MOTOR DRIVEN SLITTER OF NARROW CONFIGURATION

BACKGROUND OF THE INVENTION

This invention relates to the art of slitting paper webs, and is more particularly concerned with a new and improved arrangement wherein the lower slitter blades are power driven in a manner to permit a paper web to be slit into narrow strips.

Rotary slitters have heretofore provided for the horizontal adjustment of the upper and lower blades which are adapted for separating a paper web into strips of selected widths. Where the lower blades or slitter bands have been motor driven, it has been customary to mount the slitter bands directly on the ends of driving motor shafts which are horizontally parallel to the path of movement of the web. An example in the prior art of such an arrangement is found in U.S. Pat. No. 3,176,566. However, there are two major problems with such an arrangement. One such problem resides in that the strip width is limited to dimensions no narrower than the combined length of motor and blade. A second problem resides in that the precision with which the blade rotates is limited to the accuracy obtainable in the shaft and bearings of the motor, and the usual inaccuracies in these components results in poor quality slitting, blade damage, or both.

In more recent times the slit or strip width problem has been addressed through the application of so-called "pancake" type motors having a very short axial length relative to their diameter. However, the problems of shaft and bearing runout persist and may even be more severe.

SUMMARY OF THE PRESENT INVENTION

A principal object of the present invention is to overcome the foregoing and other disadvantages, drawbacks, inefficiencies, shortcomings and problems inherent in prior practice, and to effect substantial improvements in the slitting of paper webs.

To this end, it is another object of the present invention to provide a new and improved arrangement whereby paper webs are adapted to be slit into unusually narrow strips.

A further object of the present invention is not only to improve the range of paper strip widths at the narrow end of the range, but also to effect the improvement in this respect while attaining improved slitting accuracy.

To the attainment of these objects, the present invention provides a paper web slitter adapted for separating a paper web of substantial width into a plurality of relatively narrow strips while the web and the strips travel longitudinally along a path continuously in one direction, and comprising a plurality of upper slitter heads located above said travel path and comprising carriages mounted adjustably along a horizontal beam extending over and across said path of travel and carrying upper downwardly directed rotary slitter blades for slittingly engaging the web from above, a plurality of lower slitter heads located below said travel path and supporting lower slitter blades directed upwardly and engageable with the underside of the web and cooperating with the upper slitter blades for severing the web along longitudinal lines, a lower beam extending across said path under said lower slitter heads and supporting said lower slitter heads adjustably relative to one another along the length of the lower beam, means for rotatably mounting each of said lower slitter blades on its lower slitter head and comprising a spindle extending on an axis parallel to said beams and with precision bearings journalling the spindle in said lower slitter head, a motor carried by each of said lower carriages and having driving means extending from the motor to the spindle on an axis generally normal to the spindle axis, and power transmission means connecting said driving means in driving relation to said spindle, said lower carriages and lower blades and said motors being so related that the lower carriages with their blades and the motors are in such a narrow profile considered in the direction of web travel that the lower slitter head assemblies can be adjusted so close to one another that the lower slitter blades are enabled to cooperate without any motor profile interference with the upper slitter blades to slit the web into unusually narrow strips.

BRIEF DESCRIPTION OF THE DRAWINGS

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure, and in which:

FIG. 3 is an enlarged fragmentary sectional elevational view taken substantially along the line III—III in FIG. 2;

FIG. 4 is a fragmentary sectional elevational view taken substantially along the line IV—IV in FIG. 3;

FIG. 5 is a small scale view similar to FIG. 4 but showing a modification; and FIG. 6 is a similar view showing another modification.

DETAILED DESCRIPTION

Figure 1:
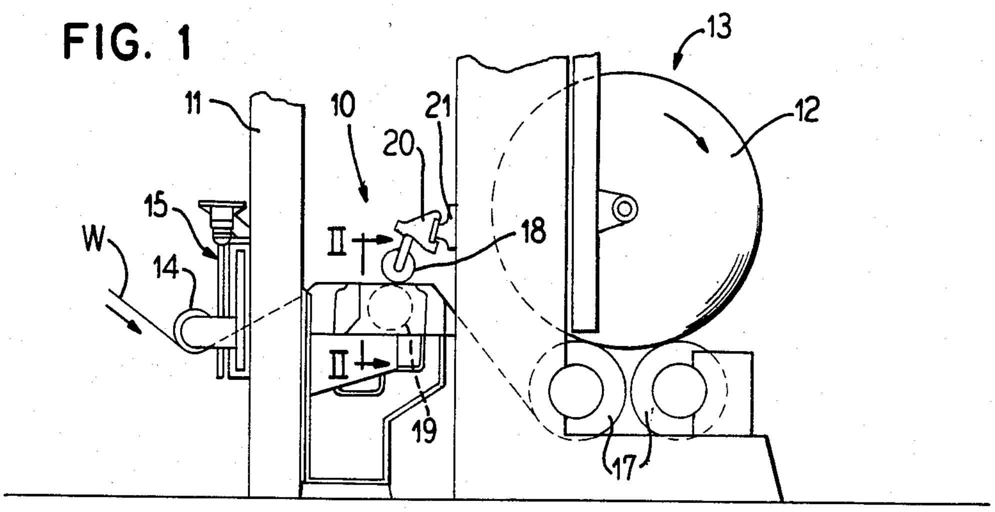
FIG. 1 is a schematic side elevational view of a slitter and winder embodying features of the invention.

As shown in FIG. 1, a typical slitter 10 in which the present invention is desirably embodied, is adapted to be supported by a suitable machine frame 11. A paper web W of any desired width is adapted to be separated by the slitter 10 into a desired number of strips which are then wound into separate rolls 12 in a winder 13. The paper web W is derived from any suitable source such as a paper making machine, a calender, or a source roll (not shown). From the source, the paper web W is adapted to pass about a guide roller 14 which is mounted on the frame 11 in a manner to permit tensioning of the web by vertical adjustment of the roller 14 by means of an adjuster 15. From the roller 14, the paper web is guided through the slitter 10 and then passes to the winder 13, or may pass to a sheeter or any other desired processing apparatus if desired. In the winder the rolls 12 are adapted to be driven rotatably in the winding direction, as indicated by directional arrow, by means of rotary drums 17 one or both of which may be driven, as is customary.

In the slitter 10, the paper web W is severed into strips of desired width by and between cooperating circular rotary components or members, comprising for each slit to be made, a top slitter blade 18 and a cooperating bottom slitter blade or slitter band 19. The slitter blades 18 and 19 are properly oriented, respectively, above and below the plane of travel of the web W for slitting of the web by cooperation of the slitting edges of the blades.

Figure 2:
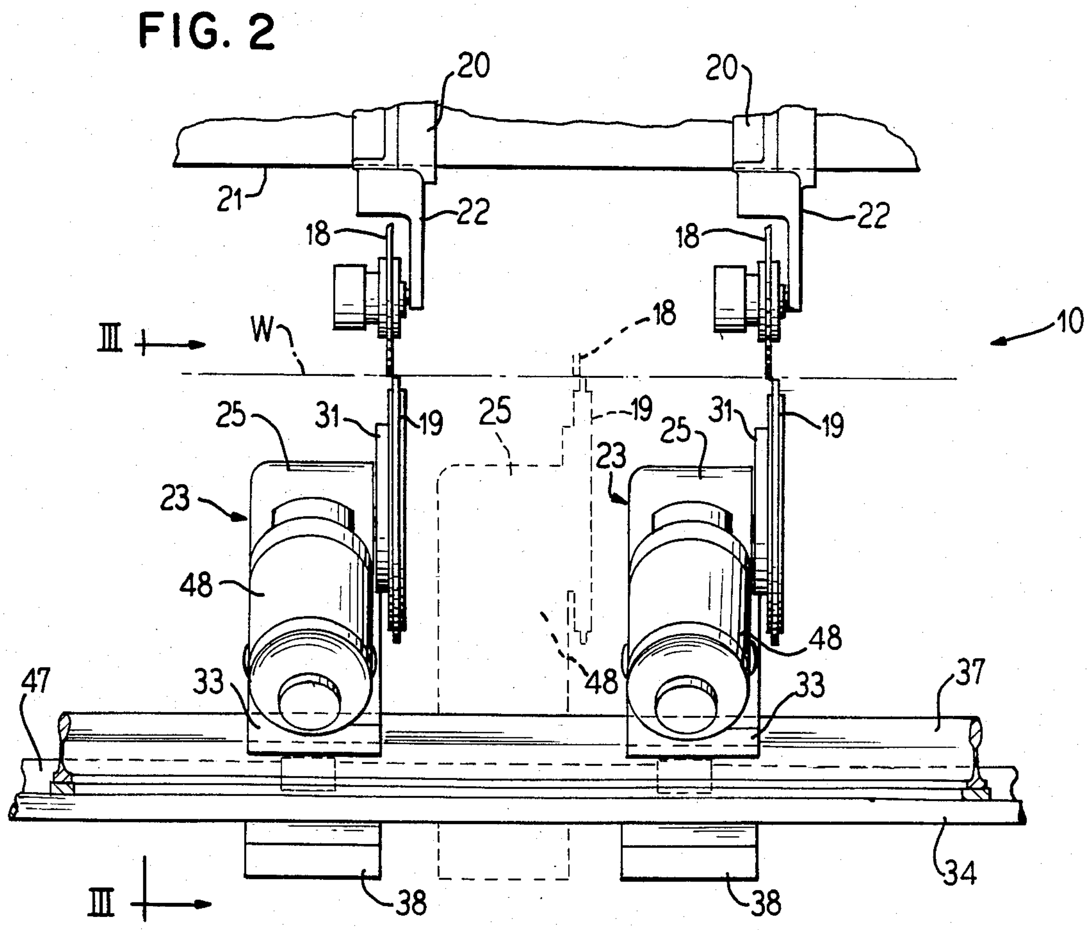
FIG. 2 is an enlarged fragmentary elevational view taken substantially in the plane of line II—II in FIG. 1.

In order to pemit not only adjustment of the upper slitting blades 18 relative to one another along a horizontal axis which extends normal to the direction of travel of the web W, each of the blades 18 is supported by adjustable carriage means comprising in each instance a carriage 20 mounted on a track or way on a cross beam 21 (FIGS. 1 and 2), and with any suitable or known means for releasably securing each carriage 20 in any desired adjusted position along the cross beam. For example, each of the blades 18 may be mounted rotatably on a bracket 22 supported by its carriage 20. Any suitable means (not shown) may be provided for vertically adjusting the brackets 22 for adjusting the vertical position of the blade 18 relative to the web W and the lower blades 19. The aforementioned U.S. Pat. No. 3,176,566 may be referred to for a more detailed description of a representative means for effecting the mounting and various adjustments of the slitter blades 18. Preferably the slitter blades 18 are adapted to be free running rotatably on their supports while the lower slitter blades or bands are adapted to be rotatably driven for assuring smooth clean slitting in cooperation with the upper blades 18 which are rotatably actuated by frictional slitting contact with the lower blades 19.

Because it is necessary to permit the blade assemblies to be adjusted throughout a substantial range across the width of the web W in order to attain the desired slitting widths in any particular instance, driving of the lower slitter blades 19 must be effected individually for each blade. As heretofore generally practiced, the lower slitter blades have been mounted directly on the driving motor shafts. As explained hereinbefore, this has the disadvantages that axially elongate motors require such clearance that the length of the motor plus the blade in each instance restricts the slit spacing of adjacent slitter assemblies. Another disadvantage is that the lower slitter blade is subject to any motor shaft and bearing inaccuracies, which results in poor quality slitting, blade damage, or both.

To alleviate these disadvantages and problems, means are provided for driving the lower slitter blades 19 within the space parameters of the side profiles of supporting carriages 23 for the blades 19 and which carriages are no wider than is necessary for stable rotary support for the blades. To this end, each of the carriages 23 comprises a vertical generally triangularly shaped standard 24 which is no wider than a hollow journal box 25 in the form of an integral structure on the top of the standard 24. Within the box 25 is a cavity 27 which opens toward the blade 19 and houses a rotary blade mounting spindle 28 which is rotatably supported in stable relation by bearings preferably comprising a roller bearing assembly 29 adjacent to a blind end of the cavity 27, and a roller bearing 30 adjacent to the open end of the cavity 30. Thereby the spindle 28 is adapted to be of simple design and precision quality, and a maximum bearing aspect ratio is attained consistent with width requirements in the slitter mount. At its outer end, the spindle 28 projects sufficiently from the cavity 27 to accommodate a flat flange hub 31 to which the blade 19 in the form of an annular disk is replaceably secured by means of bolts 32.

From the journal box 25, the standard 24 extends as a relatively narrow body flange which progressively increases in a front to rear (that is web travel) direction and has at its lower end a base structure 33 by which the carriage is adapted to be mounted for adjustment along a supporting beam 34 which underlies the running path of the web W in suitably spaced relation. Desirably the carriage base 33 has a semi-cylindrical sleeve bearing 35 (FIG. 3) which slidably engages a bulb rail 37 mounted on the lower beam adjacent to one of its edges. Along the opposite edge of the beam 34 the carriage base 33 is supported by a depending leg 38 on the carriage base and provided with antifrictional rollers 39 between which an edge flange 40 of the beam 34 is engaged. Means for locking the carriage 23 in adjusted relation along the beam 34 comprise a wedge 41 which is adapted to be manipulated by means such as a handwheel screw 42 into and out of wedging engagement with the adjacent edge of the beam flange 40. For effecting adjustments of the carriage 24 along the beam 34, means comprising a handwheel screw 43 functioning through a gear box 44 is adapted to drive a pinion 45 along a rack 47 carried by the beam 34 under the carriage base 33. Through this arrangement, when the locking wedge 41 is unlocked, the carriage 23 can be precisely shiftably adjusted along the beam 34 relative to the blade 19 associated therewith, and then the carriage can be locked in place by the wedge 41.

Driving of the slitter blade 19 in each instance is effected according to one preferred mode by means of an electrical driving motor 48 having keyed to its drive shaft 49 a miter gear 50 which meshes with a miter gear 51 keyed to the spindle 28. Through this arrangment any necessary degree of tolerance is permitted in the motor shaft 49 without adversely affecting the spindle 28, and nevertheless a one to one driving ratio between the motor and the spindle is attainable. Of course, by suitable variations in the miter gears 50 and 51 a different ratio may be attained but generally the speed of the motor may be chosen for the speed at which it is desired to drive the blade 19. As will be observed in FIG. 2, the diameter of the motors 48 is desirably no greater than the width of the carriage 23 and in particular the standard 24 and the head 25. For example, such width may be on the order of three inches in a typical instance. Motors suitable for the present purpose are commercially available.

In a preferred construction and to attain maximum stability within the narrow dimension desirable for narrow strip slitting, the carriages 23 have the bases 33 thereof elongated in the direction of web movement whereby to attain excellent stability against the maximum stresses to which the lower heads are subjected in service by the stress vector imposed by the high speed web being slit. In a practical arrangement the length of the base 33 may be on the order of twice the lower slitter head assembly width which includes the width of the carriage 23, the motor 48 and the blade assembly 19 carried at one side of the lower slitter head. From the base 33, the standard desirably rises in a generally flat triangular shape to the journal box structure 25 at the top of the standard, the major plane of the standard 24 and the box 25 being in the same direction as the base 33.

In a preferred arrangement, the motor 48 is mounted on a diagonal axis extending upwardly and toward the box 25 along one of the upwardly extending slanting sides of the generally triangular standard 24. For securing the motor 48 in place, the box 25 has a generally downwardly facing attachment face 52 disposed in a plane normal to the oblique or diagonal motor mounting axis and presenting an annular surface about a clearance opening 53 for accommodating the drive motor shaft 49 and the bevel or miter gear 50, with an enlarged counterbore 54 at the entrance into the clearance opening 53 receiving a shaft packing 55. A mounting face 57 on the shaft and of the motor 48 is drawn up tightly toward the face 52, with an intervening sealing gasket 58, by means of securing bolts 59 of which there may be four extending down from the upper portion of the box 25 into the adjacent mounting end of the casing of the motor 48.

If for any reason it is desired to have the blades 19 run freely, the motor 48 may be omitted and the openings 53 closed by securing a closure plate to the face 52.

If, as shown in FIG. 5, it is desired to employ a motor 60 which operates a flexible drive shaft 61, that may be done by connecting the flexible drive shaft 61 with a transmission stub shaft 62 journaled through a closure plate 63 attached to the end face 52' of the journal box structure 25' of the lower slitter head 23' for driving the miter gear 50' meshing with the miter gear 51' keyed to the blade spindle 28'.

If it is preferred to use an endless flexible power transmission element 64 (FIG. 6) such as a drive belt, for driving the lower blade spindle 28", the belt 64 may be connected with the spindle 28" by means of a pulley 65 attached to the spindle. Then by twisting the belt 64, if necessary, it is adapted to be trained over a drive pulley 67 on a drive shaft 68 of a motor 69.

It will be appreciated that as to either of the slitter heads 23' or 23" features other than the respective transmissions from the motors to the blade spindles may be substantially the same as described for the slitter heads 23. In all of the described instances, the driving means, whether the motor shaft 49 directly, or the flexible shaft 61, or the flexible belt 64, extends from the motor to the spindle on an axis generally normal to the spindle axis, thereby attaining the distinct advantages of maintaining the desirably narrow profile of the lower slitter head assembly for unusually narrow slitting of the web. Also, the important advantage of extremely stable accurate bearing mounting of the lower slitter blade spindle is attained for maintaining slitter accuracy.

It will be understood that variations and modifications may be effected without departing from the spirit and scope of the novel concepts of this invention.

We claim as our invention:

1. A paper web slitter adapted for separating a paper web of substantial width into a plurality of relatively narrow strips while the web and the strips travel longitudinally along a path continuously in one direction, and comprising:

a plurality of upper slitter heads located above said travel path and comprising carriages mounted adjustably along a horizontal beam extending over and across said path of travel and carrying upper downwardly directed rotary slitter blades for slittingly engaging the web from above;

a plurality of lower slitter heads located below said path of travel and supporting lower slitter blades directed upwardly and engageable with the underside of the web and cooperating with the upper slitter blades for severing the web along longitudinal lines;

a lower beam extending across said path under said lower slitter heads and supporting said lower slitter heads adjustably relative to one another along the length of the lower beam;

a relatively short journal box mounted on each of said slitter heads and rotatably mounting each of said lower slitter blades by means of a respective spindle extending axially into one end of said journal box on an axis parallel to said beams and with spaced precision bearings journalling the spindle in said journal box;

a motor carried by each of said lower carriages and having driving means extending from the motor into said journal box to the spindle on an axis generally normal to the spindle axis;

and power transmission means connecting said driving means in driving relation to said spindle between said bearings, said lower carriages and lower blades and said motors being so related that the lower carriages with their blades and the motors are in such a narrow profile considered in the direction of web travel that the lower slitter heads can be adjusted so close to one another that the lower slitter blades are enabled to cooperate without any motor profile interference with the upper slitter blades for slitting the web into unusually narrow strips.

2. A paper web slitter according to claim 1, wherein said lower slitter heads comprise upright standards having base portions supported on said lower beam, the standards being of generally triangular configuration with their wider lower ends along said base portions and having integrally on their upper ends said hollow journal boxes within which said spindles are rotatably supported on said bearings.

3. A paper web slitter according to claim 2, wherein said journal boxes have generally downwardly facing attachment faces with openings therethrough into said boxes, means attaching said motors to said faces, and the driving means of the motors extending through said openings and having said power transmission means connecting said motor shafts to said spindles.

4. A paper web slitter according to claim 3, wherein said faces are directed on oblique axes downwardly, and said motors extend on said oblique axes toward said faces.

5. A paper web slitter according to claim 1, wherein said driving means comprise flexible shafts connecting said motors with said power transmission means.

6. A paper web slitter according to claim 1, wherein said driving means comprise endless flexible belts connecting said motors with said transmission means.

7. A paper web slitter according to claim 1, wherein said driving means comprise motor shafts carrying miter gears which mesh with miter gears on said spindles.

8. A paper web slitter adapted for separating a paper web of substantial width into a plurality of relatively narrow strips while the web and the strips travel along a path continuously in one direction, and comprising:

a plurality of upper slitter heads located above said path of travel and comprising carriages mounted adjustably along a horizontal beam extending across said path of travel and carrying upper rotary slitter blades for slittingly engaging the web from above;

a plurality of lower slitter heads located below said path of travel and supporting lower slitter blades engageable with the underside of the web and cooperating with the upper slitter blades for severing the web along longitudinal lines;

a lower beam extending across said path and located supportingly under said lower slitter heads which are adjustable relative to one another along the length of the lower beam;

each of said lower slitter heads comprising a narrow elongate base extending across said lower beam;

means supporting each base for adjustment along the length of said beam and thus transversely relative to the web;

a generally triangular standard extending upwardly from said base with its lower end elongated and extending lengthwise along said base and having respective edges tapering up from each end of said base to a peak on which is carried a hollow journal box on the upper end of the standard;

said standard and said journal box being of substantially the same width and having generally parallel sides facing in the direction of the extent of said beams;

a rotary blade spindle within said box and having spaced bearings journaling the spindle within the box on an axis parallel to said beams, and one end of the spindle extending out of one side of the box and having one of said lower slitter blades mounted corotatively thereon;

a face on said box directed downwardly on an oblique axis projected along one of the triangular upwardly extending edges of said standard and having an opening therethrough into said box;

and a motor carried by said lower slitter head and having driving means extending through said opening;

and power transmission means connecting said driving means with said spindle between said spaced bearings.

9. A slitter according to claim 8, wherein said motor has an attachment face, and means securing said attachment face of the motor to said face on the box.

10. A slitter according to claim 9, wherein said motor has a shaft extending through said opening into said box, and a miter gear on said shaft meshes with a miter gear on said spindle.

11. A slitter according to claim 8, wherein said driving means comprises a flexible shaft extending from said motor and through said opening into said journal box.

12. A slitter according to claim 8, wherein said driving means comprises an endless flexible belt driven by said motor and driving said spindle.

13. In a paper web slitter adapted for slitting paper web travelling along a continuous path in one direction:

a slitter head having a supporting structure;

a hollow journal box having a journal chamber therein and the box being mounted on said supporting structure;

a slitter blade having a spindle extending therefrom into said chamber and journaled in said journal box;

means for journaling said spindle in said journal box chamber comprising a pair of bearings in spaced relation within said chamber and rotatably supporting said spindle therebetween;

a face on said journal box extending parallel to said spindle and having an opening on an axis at right angles to said spindle;

and means received through said opening and drivingly coupled to said spindle between said bearings for driving said spindle.

14. In a slitter according to claim 13, said bearing means comprising a motor mounted on said face and having a shaft extending into said journal box through said opening and drivingly connected to said spindle between said bearings.

15. In a slitter according to claim 13, said bearing means comprising a motor carried by said slitter head and having a flexible shaft extending through said opening and drivingly connected to said spindle between said bearings.

16. In a slitter according to claim 13, said bearing means comprising a motor carried by said slitter head and having a flexible driving belt extending through said opening and drivingly connected to said spindle between said bearings.

17. In a slitter according to claim 13, wherein said slitter head has an elongate base portion and a generally triangular narrow profile standard extending upwardly from said base portion and having said journal box on its upper end.

* * * * *